(12) United States Patent
Rinker

(10) Patent No.: US 9,074,138 B2
(45) Date of Patent: Jul. 7, 2015

(54) PROCESS FOR TREATING COAL USING MULTIPLE DUAL ZONE STEPS

(75) Inventor: Franklin G. Rinker, Marco Island, FL (US)

(73) Assignee: C2O Technologies, LLC, Marco Island, FL (US)

( * ) Notice: Subject to any disclaimer, the term of this patent is extended or adjusted under 35 U.S.C. 154(b) by 793 days.

(21) Appl. No.: 13/231,149

(22) Filed: Sep. 13, 2011

(65) Prior Publication Data

US 2013/0062186 A1    Mar. 14, 2013

(51) Int. Cl.
| | |
|---|---|
| C10B 57/02 | (2006.01) |
| C10B 53/04 | (2006.01) |
| C10B 57/10 | (2006.01) |
| C10B 51/00 | (2006.01) |
| C10B 57/08 | (2006.01) |
| C10L 9/06 | (2006.01) |
| C10G 1/02 | (2006.01) |
| F26B 3/084 | (2006.01) |
| C10B 49/10 | (2006.01) |

(52) U.S. Cl.
CPC .............. *C10B 53/04* (2013.01); *C10B 49/10* (2013.01); *C10B 51/00* (2013.01); *C10B 57/02* (2013.01); *C10B 57/08* (2013.01); *C10L 9/06* (2013.01); *C10B 57/10* (2013.01); *C10G 1/02* (2013.01); *F26B 3/084* (2013.01)

(58) Field of Classification Search
CPC ........ C10B 47/24; C10B 49/10; C10B 51/00; C10B 53/04; C10B 57/02; C10B 57/08; C10B 57/10; C10L 9/06; C10G 1/02; F26B 3/084

USPC ............ 201/9, 29, 30, 31, 44; 34/370; 44/626
See application file for complete search history.

(56) References Cited

U.S. PATENT DOCUMENTS

| | | | |
|---|---|---|---|
| 1,669,023 A | * | 5/1928 | Runge ............................. 201/9 |
| 1,814,980 A | | 7/1931 | Wessel |
| 1,976,908 A | | 10/1934 | Wittenberg |
| 2,029,883 A | | 2/1936 | MacCubbin et al. |
| 2,040,100 A | | 5/1936 | Miller |
| 2,044,764 A | | 6/1936 | Bywater |

(Continued)

OTHER PUBLICATIONS

International Search Report and Written Opinion, Application No. PCT/US11/51927, Dated Mar. 27, 2012.

(Continued)

*Primary Examiner* — Jill Warden
*Assistant Examiner* — Joye L Woodard
(74) *Attorney, Agent, or Firm* — MacMillan, Sobanski & Todd, LLC

(57) ABSTRACT

A process for treating agglomerating coal includes drying coal in a drying step, and treating the dried coal in an oxidizing step to form oxides sufficient to convert the coal into a substantially non-agglomerating coal. The oxidized coal is pyrolyzed in a pyrolysis step to form coal char, and the coal char is cooled. At least one of the drying, oxidizing, and pyrolyzing steps is a dual zone step, with the dual zone step having a first zone and a second zone, with the temperature of the second zone being higher than that of the first zone. The effluent from such a dual zone pyrolyzer are subjected to a condensation process to separate the effluents into liquids and on-gases, and the on-gases are combined with other available gases to achieve a composition of blended on-gases having a specific heat of at least about 0.50 Btu/lb-° F. (2.013 kJ/Kg ° C.) at 1200° F. (649° C.) and recirculated into the pyrolyzer.

17 Claims, 6 Drawing Sheets

(56) References Cited

U.S. PATENT DOCUMENTS

| | | | |
|---|---|---|---|
| 2,131,702 A * | 9/1938 | Berry | 201/44 |
| 2,260,072 A | 10/1941 | Wilton | |
| 2,366,900 A | 1/1945 | Weir | |
| 2,528,553 A | 11/1950 | Royster | |
| 2,666,796 A | 1/1954 | Gorin et al. | |
| 2,693,409 A | 11/1954 | Stephens, Jr. | |
| 2,748,063 A | 5/1956 | Radasch | |
| 2,774,716 A | 12/1956 | Kulik | |
| 3,010,893 A | 11/1961 | Kulik | |
| 3,047,472 A * | 7/1962 | Gorin et al. | 201/9 |
| 3,375,175 A | 3/1968 | Eddinger et al. | |
| 3,463,310 A | 8/1969 | Ergun et al. | |
| 3,574,065 A | 4/1971 | Eddinger et al. | |
| 3,585,732 A | 6/1971 | Itahashi | |
| 3,736,233 A | 5/1973 | Sass et al. | |
| 3,938,966 A | 2/1976 | Kindig et al. | |
| 4,028,219 A | 6/1977 | Baldwin et al. | |
| 4,036,603 A | 7/1977 | Bernet et al. | |
| 4,052,170 A | 10/1977 | Yan | |
| 4,119,523 A | 10/1978 | Baldwin et al. | |
| 4,146,367 A | 3/1979 | Hsu | |
| 4,149,939 A | 4/1979 | Solano | |
| 4,156,595 A | 5/1979 | Scott et al. | |
| 4,213,826 A | 7/1980 | Eddinger et al. | |
| 4,234,386 A | 11/1980 | Stirling | |
| 4,263,124 A | 4/1981 | Wickstrom et al. | |
| 4,322,222 A | 3/1982 | Sass | |
| 4,341,598 A | 7/1982 | Green | |
| 4,395,309 A | 7/1983 | Esztergar | |
| 4,411,766 A | 10/1983 | Garg et al. | |
| 4,411,767 A | 10/1983 | Garg | |
| 4,466,362 A | 8/1984 | Maxwell et al. | |
| 4,534,847 A | 8/1985 | Roberts et al. | |
| 4,605,790 A | 8/1986 | Wojtkowski | |
| 4,678,478 A | 7/1987 | Kelland | |
| 4,834,650 A | 5/1989 | Docherty et al. | |
| 5,017,283 A | 5/1991 | Oder | |
| 5,087,269 A | 2/1992 | Cha et al. | |
| 5,114,700 A | 5/1992 | Meihack et al. | |
| 5,127,586 A | 7/1992 | Oder | |
| 5,151,159 A | 9/1992 | Wolfe et al. | |
| 5,171,406 A * | 12/1992 | Shang et al. | 201/31 |
| 5,176,260 A | 1/1993 | Oder | |
| 5,240,592 A | 8/1993 | Meyer et al. | |
| 5,326,457 A | 7/1994 | Stipanovich, Jr. | |
| 5,372,497 A | 12/1994 | Coolidge et al. | |
| 5,373,648 A | 12/1994 | Wolf | |
| 5,401,364 A | 3/1995 | Rinker | |
| 5,496,465 A | 3/1996 | Fraas | |
| 5,547,549 A | 8/1996 | Fraas | |
| 5,601,692 A | 2/1997 | Rinker et al. | |
| 5,711,769 A | 1/1998 | Rinker et al. | |
| 5,730,069 A | 3/1998 | Coolidge et al. | |
| 5,997,289 A | 12/1999 | Dover | |
| 8,470,134 B2 | 6/2013 | Rinker | |
| 2003/0118962 A1 | 6/2003 | Munzer et al. | |
| 2004/0065307 A1 | 4/2004 | Fiveland et al. | |
| 2007/0272538 A1 | 11/2007 | Satchell | |
| 2008/0116052 A1 | 5/2008 | Eatough et al. | |
| 2008/0201980 A1 * | 8/2008 | Bullinger et al. | 34/493 |
| 2009/0119981 A1 | 5/2009 | Drozd et al. | |
| 2011/0011719 A1 | 1/2011 | Rinker | |
| 2011/0011720 A1 | 1/2011 | Rinker | |

OTHER PUBLICATIONS

Berkowitz N., An Introduction to Coal Technology, 1994, 2nd Edition, pp. 102-103; 164-165.

Dadayburjor, et al., Coal Conversion Processes Liquefaction, Kirk-Othmer Encyclopedia of Chemical Technology, 2003, vol. 6, pp. 851-856.

Kreith, F., Principles of Heat Transfer, 2nd Ed. 1965, pp. 236-238.

Mahajan O. et al., Low-temperature air oxidation of caking coals. 1. Effect on subsequent reactivity of chars produced, FUEL, 1980, vol. 59, Jan. pp. 3-10.

Oder, R., Dry magnetic Separation of Ash, Sulfur, and Mercury From A Southwestern Wyoming Coal, presented at the 18th International Low Rank Fuels Symposium, Jun. 24-26, 2003, Billings, Mt, pp. 1-6.

The International Search Report and The Written Opinion, PCT/US2010/041918, dated Feb. 24, 2011.

International Search Report, Application No. PCT/US2012/039598, Dated Dec. 28, 2012.

Written Opinion of the International Searching Authority, Application No. PCT/US2012/039598, Dated Dec. 28, 2012.

* cited by examiner

PROCESS FOR TREATING COAL USING MULTIPLE DUAL ZONE STEPS

RELATED APPLICATIONS

This application is related to pending U.S. patent application Ser. No. 12/556,935 filed Sep. 10, 2009, and entitled Process for Treating Coal by Removing Volatile Components, which is entitled to priority from Application Ser. No. 61/225,406 filed Jul. 14, 2009, entitled Process for Treating Coal by Removing Volatile Components.

This application is also related to pending U.S. patent application Ser. No. 12/556,977 filed Sep. 10, 2009, and entitled Process for Treating Agglomerating Coal by Removing Volatile Components, which is entitled to priority from Application Ser. No. 61/225,406.

This application is also related to pending U.S. patent application Ser. No. 12/557,041 filed Sep. 10, 2009, and entitled Process for Treating Bituminous Coal by Removing Volatile Components, which is entitled to priority from Application Ser. No. 61/225,406.

The disclosures of all of the above patent applications are incorporated herein by reference in their entirety. This invention was made with no Government support and the Government has no rights in this invention.

TECHNICAL FIELD

The present invention relates to the field of coal processing, and more specifically to a process for treating agglomerating or various types of bituminous coal for the production of higher value coal derived products, suitable for use in various industries, including metallurgical or power production uses.

BACKGROUND OF THE INVENTION

Coal in its virgin state is sometimes treated to improve its usefulness and thermal energy content. The treatment can include drying the coal and subjecting the coal to a pyrolysis process to drive off low boiling point organic compounds and heavier organic compounds. Thermal treatment of coal causes the release of certain volatile hydrocarbon compounds having value for further refinement into transportation liquid fuels and other coal derived chemicals. Subsequently, the volatile components can be removed from the effluent or gases exiting the pyrolysis process. Thermal treatment of coal causes it to be transformed into coal char by virtue of the evolution of the coal volatiles and products of organic sulfur decomposition, and the magnetic susceptibilities of inorganic sulfur in the resultant char are initiated for subsequent removal of such undesirable components as coal ash, inorganic sulfur and mercury from the coal char.

The effective removal of such volatile components as coal ash, inorganic sulfur and organic sulfur, and mercury, from coal char is problematic. It would be advantageous if agglomerating or bituminous coal could be treated in such a manner that would enable volatile components to be effectively removed from the coal at more desirable concentrations, thereby creating a coal char product having reduced organic sulfur and mercury. Also, it would be helpful if agglomerating coal could be treated to make it non-agglomerating coal. It would be further advantageous if bituminous coal could be refined in such a manner to create a second revenue stream (i.e., condensable coal liquids), which could be collected to produce syncrude. A process for treating agglomerating or for beneficiating bituminous coal, including reducing sulfur, mercury and ash, evolving valuable coal liquids and fuel gas, increasing calorific value, and improving other properties of the resultant coal char product, is desirable.

SUMMARY OF THE INVENTION

In a broad aspect, there is provided herein a process for treating coal. According to this invention there is provided a process for treating coal, the process including drying coal in a drying step, and treating the dried coal in an oxidizing step to form oxides sufficient to convert the coal into a substantially non-agglomerating coal. The oxidized coal is pyrolyzed in a pyrolysis step to form coal char, and the coal char is cooled. At least one of the drying, oxidizing, and pyrolyzing steps is a dual zone step, with the dual zone step having a first zone and a second zone, with the temperature of the second zone being higher than that of the first zone.

According to this invention there is also provided a process for treating coal including drying coal in a drying step, and pyrolyzing the coal in a pyrolyzer to form coal char. Effluent is vented from the pyrolyzer, and the effluent is subjected to a condensation process to separate the effluent into liquids and on-gases. The on-gases can be recirculated into the pyrolyzer.

According to this invention there is also provided a process for treating coal, including drying coal in a drying step, treating the dried coal in an oxidizing zone to form oxides sufficient to convert the coal into a substantially non-agglomerating coal, and pyrolyzing the oxidized coal in a pyrolysis zone to form coal char. The coal char is cooled. At least one of the drying, oxidizing, and pyrolyzing zones is heated with both a source of direct heat with hot gases and a source of indirect heat with at heat exchanger.

Various advantages of this invention will become apparent to those skilled in the art from the following detailed description of the preferred embodiment, when read in light of the accompanying drawings.

DETAILED DESCRIPTION OF THE INVENTION

The process described below pertains to treating agglomerating coal and various types of bituminous coal for the production of coal derived liquid (CDL) and other higher value coal derived products, such as a high calorific value, low volatile, low ash, low sulfur coal, also known as char, suitable for a variety of uses in industry, including metallurgical uses and power production. Processing includes removing desired amounts of volatile components from the coal to refine the solid coal and to create a second revenue stream. The volatile components can be condensed into coal derived liquids, which can be collected to produce syncrude useful for production of transportation fuels and other related products.

Figure 1:
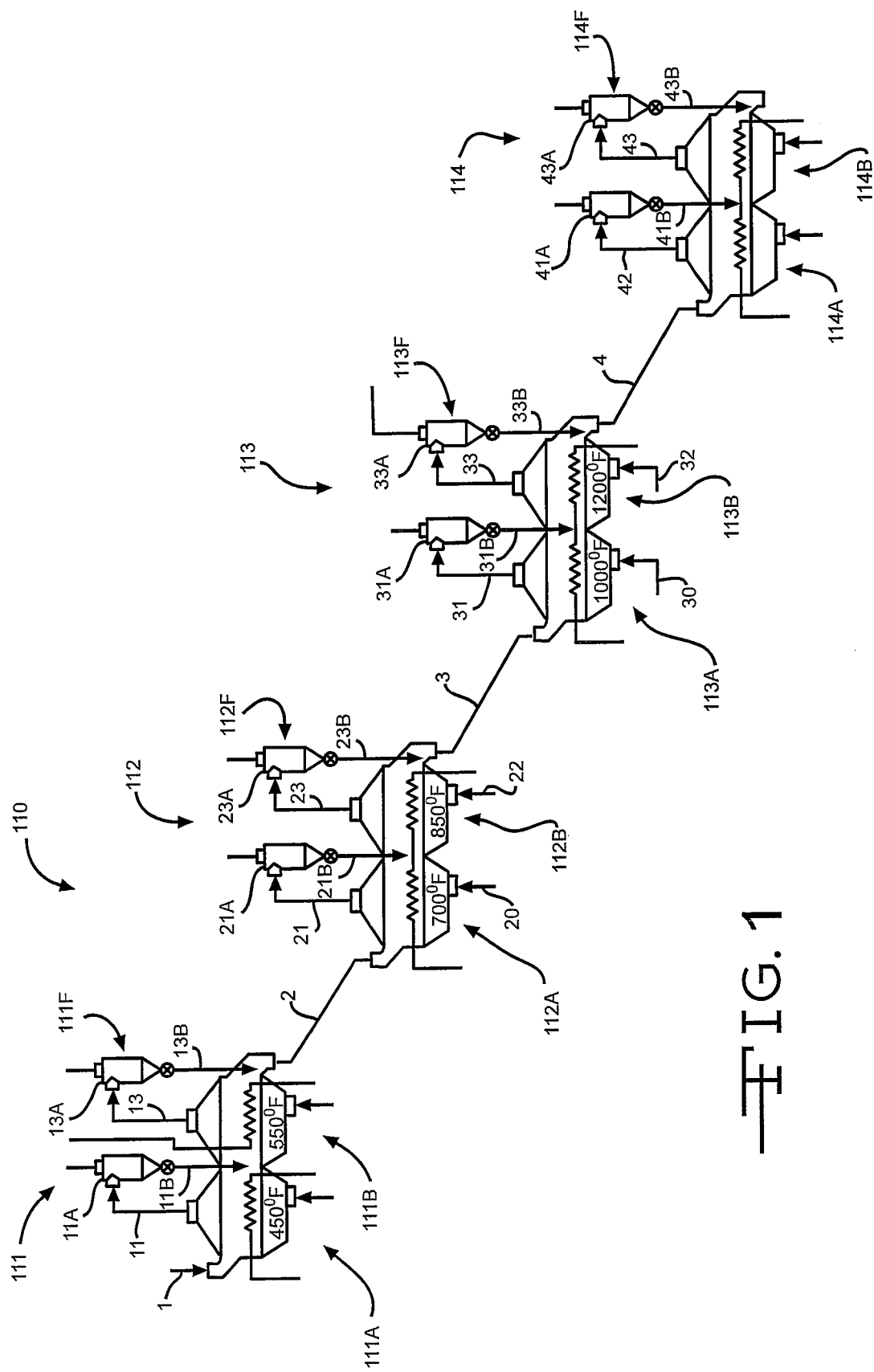
FIG. 1 is a schematic illustration of a process for treating various types of bituminous coal.

Referring now to FIG. 1, a schematic illustration of a process 110 for treating various types of bituminous coal is shown. Other types of coal can also be treated with the process. A stream of pulverized coal 1 is subjected to a drying step by being introduced into a dryer 111 where the coal is heated and dried. Optionally the coal 1 is pulverized to a size passing 20 mesh prior to being introduced into the dryer 111. In one embodiment, the coal 1 is pulverized to a size within a range of from about minus 10 mesh to about minus 100 mesh. The dryer 111 can be any suitable dryer, such as a fluidized bed drier. The drier 111 is a dual zone or dual stage drying apparatus having a first drying zone 111A and a second drying zone 111B. Optionally the dryer could be a single zone dryer.

Figure 2:
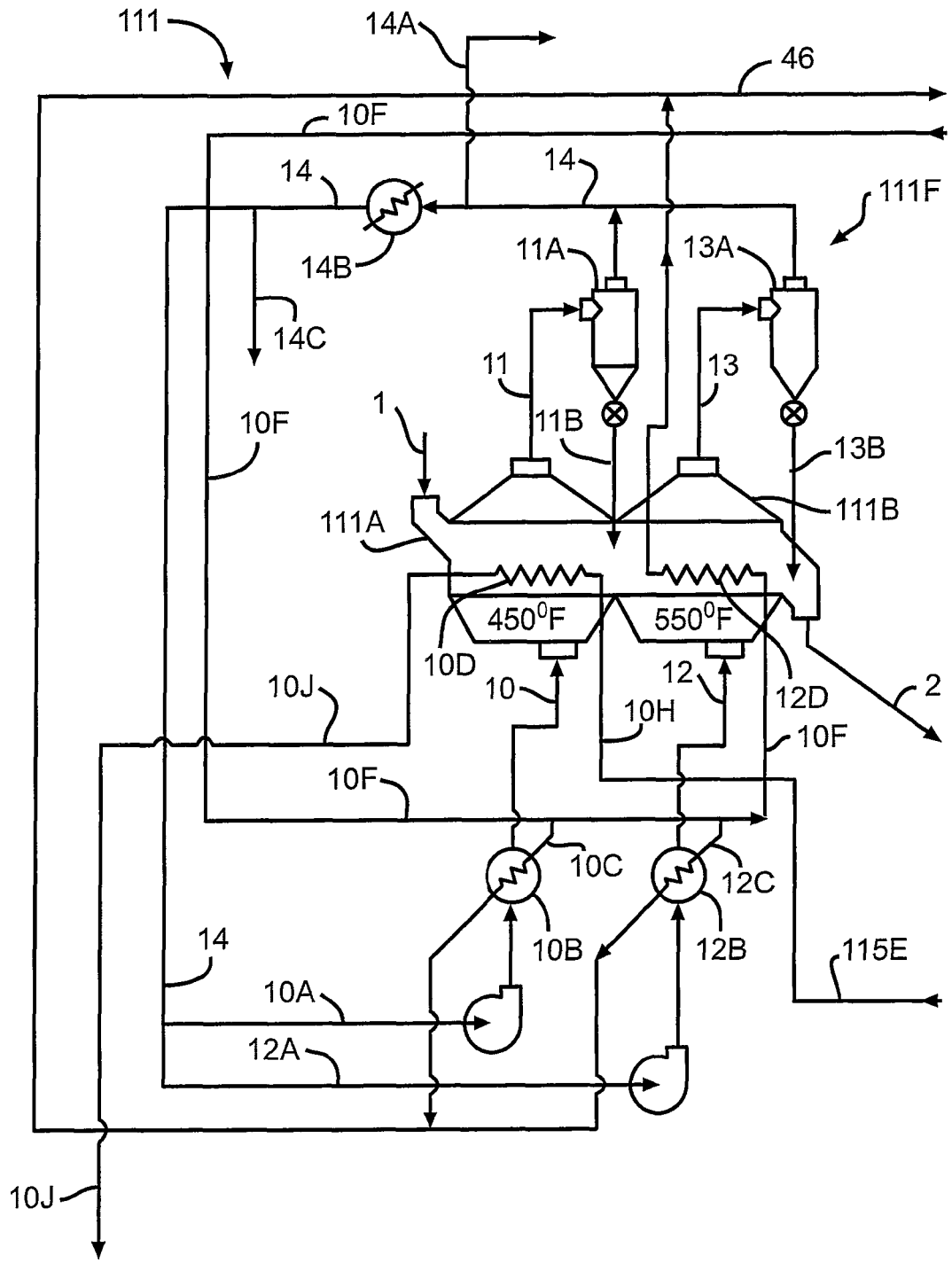
FIG. 2 is a schematic illustration of a dual zone drying process step of the process shown in FIG. 1.

The first drying zone 111A can include a fluidized bed, although any suitable dryer arrangement can be used. As shown in FIG. 2, in the first drying zone 111A the coal is subjected to heating by two different sources. First a flow of hot gases is introduced via line 10 though a fluidized bed or by any other means. This provides direct heating because the gases are passed directly into contact with the coal in the dryer. In the embodiment shown the hot gases are supplied to the first drying zone 111A at a temperature of about 450° F. (232° C.), although the hot gases can have a higher or lower temperature. The hot gases can be provided from any suitable source. In the illustrated embodiment the hot gases are produced by passing air through a heat exchanger 10B, as shown in FIG. 2. The heat source for heat exchanger 10B can be any suitable source, such as a supply of heat transfer fluid fed through the heat exchanger 10B via line 10C, which in turn is fed by heat transfer fluid line 10F. The heat transfer fluid line 10F can be supplied by a heat transfer fluid system that uses waste heat from other steps in the overall process, and may also be heated by an auxiliary heat transfer fluid heater or a start up heat transfer fluid heater, not shown.

The first drying zone 111A is also supplied with indirect heat from a steam heat exchanger indicated at 10D, which can be an array of heat exchange pipes for an enclosed or captive flow of steam, or any other suitable indirect heat exchange system. Since the heat from the heat exchanger is indirectly applied or transferred to the coal in the first drying zone 111A, this source of heat to the coal does not add any gases to the first drying zone, thereby minimizing the amount of gas passing through the first dryer zone. The benefit of reduced gas throughput is a minimization of entrained particulate matter. The steam for the heat exchanger 10D can be supplied from any suitable source, such as a source of steam via line 10H. The steam passing through the first drying zone 111A is then circulated through steam line 10J and directed to the fired heater 115, shown in FIG. 3. Before the steam reaches the fired heater 115, the steam must be condensed back to water, and therefore in a specific embodiment the steam is passed through one or more cooling mechanisms. One such cooling mechanism can be a heat exchanger, not shown, supplied with chill water.

In the illustrated embodiment the first drying zone 111A is maintained at a temperature no greater than about 500° F. (260° C.). This avoids driving off organic volatile components at this stage in the overall process, thereby allowing venting of the effluent to the atmosphere if desired. Further, the first drying zone provides a cooling heat transfer surface suitable for condensation of a portion of the steam in the coils of the heat exchanger 10D. The second drying zone 111B is also supplied with heat from a heat transfer fluid, which enables recycling heat from another process step. In one embodiment, heat is supplied with hot gases via line 12 at a temperature of about 550° F. (288° C.), although the temperature can be higher or lower. The hot gases can be provided from any suitable source. In the illustrated embodiment the hot gases are produced by passing gases through a heat exchanger 12B. The heat source for heat exchanger 12B can be any suitable source. In one embodiment heat is supplied by a heat transfer fluid recycling heat backwards from another process step. This can be the supply of heat transfer fluid fed from heat transfer fluid line 10F fed through via line 12C.

The second drying zone 111B is also supplied with indirect heat from a heat exchanger indicated at 12D, which can be an array of heat exchange pipes for the enclosed or captive flow of heat transfer fluid from line 10F, or any other suitable indirect heat exchange system. Heat exchanger 12D provides heat in an indirect manner to minimize the amount of gases actually introduced into the second drying zone 111B.

It can be seen that in each of the first and second dryer zones, there is a source of both direct heat with hot gases (via lines 10 and 12), and indirect heat with the heat exchangers 10D and 12D, respectively. Also, it can be seen that the source of indirect heat supplied to heat exchanger 10D, i.e., hot steam, is different from the source of indirect heat supplied to heat exchanger 12D, i.e., heat transfer fluid. In the illustrated embodiment the second drying zone 111B is maintained at a temperature no greater than about 600° F. The second drying zone 111B is maintained at a higher temperature than the temperature of the first drying zone 111A. The result of processing the coal through the dryer 111 is a stream of dry coal 2 having a temperature of about 400° F., although it could be higher or lower.

As shown in FIG. 2, an effluent recovery system 111F is provided to receive the gases vented via lines 11 and 13 from the first and second drying zones 111A and 111B, respectively. The effluent recovery system 111F includes cyclone separators 11A and 13A which separate the particulate matter and return such matter to the two drying zones via particulate return lines 11B and 13B, respectively. The gases separated from the particulate matter are vented from the cyclone separators 11A and 13A via line 14. Some of the gases may be vented to the atmosphere via line 14A. The remainder of the gases are returned to the drying system, i.e., first and second drying zones 111A and 111B, via gas lines 10A and 12A, respectively. Optionally a water cooling heat exchanger 14B can be placed in line 14 to cool the gases. The cooling may cause some condensation, and the condensate (water) can be removed via line 14C.

Figure 3:
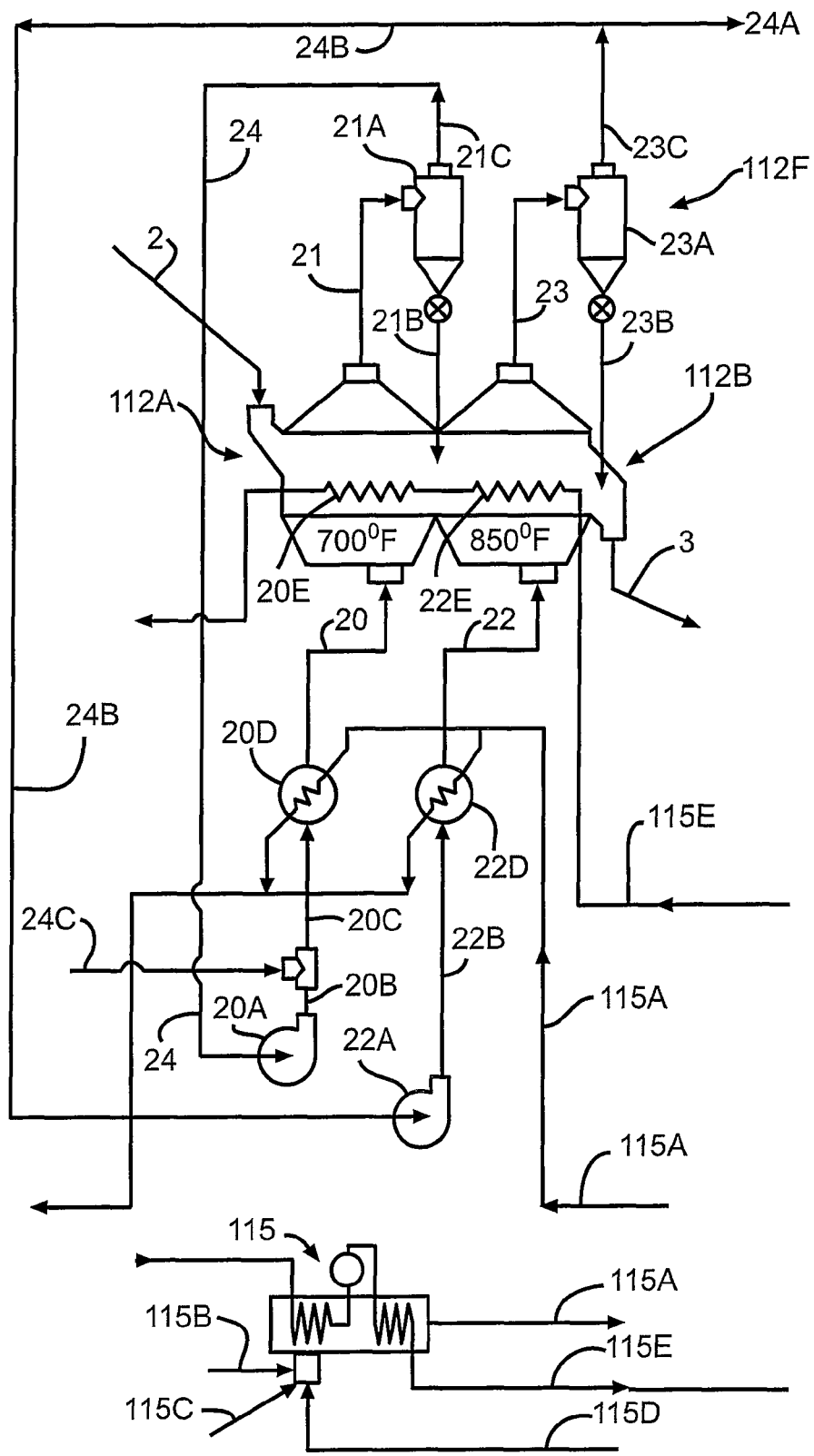
FIG. 3 is schematic illustration of an oxidizing process step of the process shown in FIG. 1.

After being dried in the dryer 111, the dried coal 2 is transferred to the oxidizer 112A and supplemental heating zone 112B, shown in FIGS. 1 and 3, where oxidizing of the coal and a supplemental heating process is carried out. The purpose of the oxidizing step is to continue to raise the temperature of the coal and to do so with oxygen-containing gases so that the coal particles become coated with various oxides, thereby helping to convert the coal into non-agglomerating coal for further ease in processing. In the oxidizing zone 112A the coal is subjected to hot gases supplied by line 20 and introduced via a fluidized bed at a temperature of about 700° F. (371° C.). The temperature could be higher or lower. The hot gases in line 20 can be provided from any suitable source. In the illustrated embodiment the hot gases are produced by passing air or other gases through a heat exchanger 20D. The gases are driven by fan 20A via lines 20B and 20C through the heat exchanger 20D. The hot gases supplied by line 20 have an oxygen content sufficient to oxidize the surface of the coal particles so as to eliminate or reduce the agglomerating nature of the coal. Oxygen supply line 24C is provided to allow the addition of supplemental oxygen.

The heat source for heat exchanger 20D can be any suitable source, such as a supply of hot flue gases 115A from a fired heater 115. The fired heater 115 can be supplied with fuel such as natural gas via line 115B, and with air or oxygen at oxygen boost supply 115C. Optionally, or in addition to the fuel 115B, the fired heater 115 can be supplied with process fuel gas or on-gas generated from the overall process 110, via line 115D. It is to be understood that other fuels could also be used. In one embodiment the hot flue gases 115A from the fired heater 115 are generated at a temperature of about 1600° F. (871° C.). The hot gases could be generated at higher or lower temperatures, such as being within the range of from about 1300° F. (704° C.) to about 1800° F. (982° C.). It can be seen that the flue gases 115A generated from the fired heater 115 are supplied to the heat exchanger 20D. In the heat exchanger 20D the recirculated oxidizing gases have their temperature raised up to the desired temperature of about 700° F. (371 C).

Also, the fired heater 115 can be configured to generate steam for other steps in the overall coal treating process 110. Steam generated by the fired heater 115 is transmitted via seam line 115E to various portions of the process. In one embodiment the steam from the fired heater 115 is generated at a temperature of about 1500° F. (816° C.) at a pressure of about 650 PSIG (4485 kPa). In other embodiments the steam can be at a higher or lower temperature, and at a higher or lower pressure. The oxidizing zone 112A is also supplied with heat from a steam heat exchanger indicated at 20E, which can be an array of heat exchange pipes for the enclosed or captive flow of steam, or any other suitable heat exchange system. The steam for the heat exchanger 20E can be from any suitable source, such as the steam supplied by steam line 115E from the fired heater 115.

The supplemental heating zone 112B receives the coal from the oxidizing zone 112A and adds additional heat. Heat is supplied in the form of hot gases supplied by line 22 and introduced via a fluidized bed at a temperature of about 850° F. (454° C.), although the temperature can be higher or lower. The hot gases in line 22 can be provided from any suitable source. In the illustrated embodiment the hot gases are produced by passing air or other gases through a heat exchanger 22D. The gases are driven by fan 22A via line 22B through the heat exchanger 22D. In contrast to gases of line 20, the hot gases in line 22 are substantially free of oxygen, having an oxygen content of less than about 0.5 percent, and in the illustrated embodiment an oxygen content of less than about 0.02 percent. It has been found that once the temperature of the coal in a zone reaches about 800° F., the volatilization of oils in the coal begins. Therefore the treatment of the effluent from the first pyrolyzing zone must be capable of handling the volatile material.

The supplemental heating zone 112B is also supplied with heat from a steam heat exchanger indicated at 22E, which can be an array of heat exchange pipes for the enclosed or captive flow of steam, or any other suitable indirect heat exchange system. The steam for the heat exchanger 22E can be from any suitable source, such as the steam supplied by steam line 115E from the fired heater 115. It can be seen that the steam from heat exchanger 22E flows directly upstream to heat exchanger 20E.

The supplemental heating zone 112B is maintained at a higher temperature than the temperature of the oxidizing zone 112A. The result of processing the coal through the oxidizing and supplemental heating steps 112A and 112B is a stream of dry coal 3 having a temperature of about 750° F. (399° C.), although it could be higher or lower. The supplemental heating zone 112B is maintained at a higher temperature than the temperature of the oxidizing zone 112A.

Figure 6:
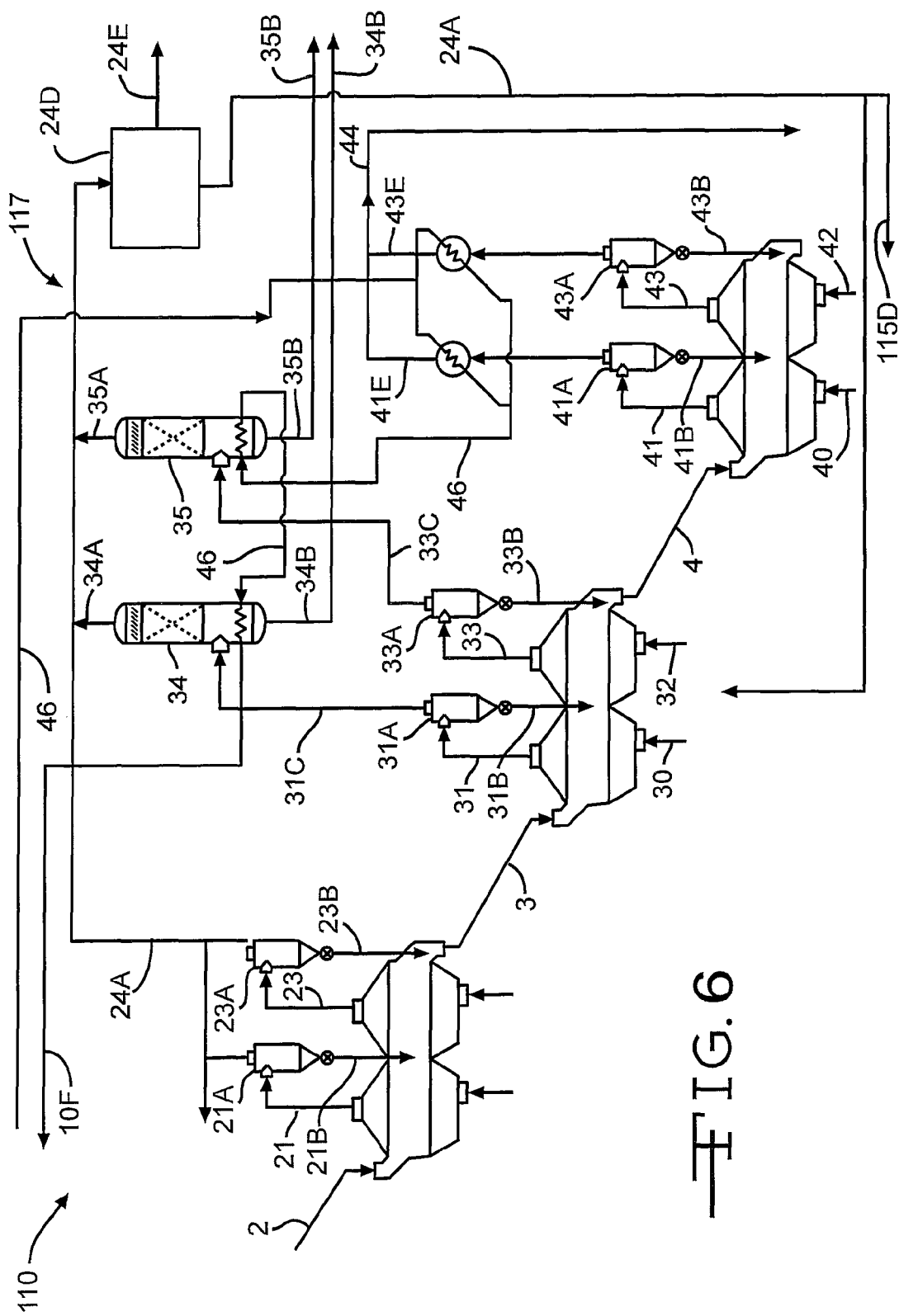
FIG. 6 is a schematic view of an oil recovery system.

As further shown in FIG. 3, an effluent recovery system 112F is provided to receive the gases vented via lines 21 and 23 from the oxidizing zone 112A and supplemental heating zone 112B, respectively. The effluent recovery system 112F includes cyclone separators 21A and 23A which separate the particulate matter, primarily coal fines, and return such matter to the oxidizing zone 112A and supplemental heating zone 112B via particulate return lines 21B and 23B, respectively. The gases separated from the particulate matter are vented via lines 21C and 23C, but the gases are not commingled. The gases vented from cyclone 21A via line 21C necessarily contain significant amounts of oxygen whereas the gases vented from cyclone 23A via line 23C purposefully contain almost no oxygen. Accordingly, the gases vented through line 21C are recycled via line 24, back to the input fan 20A. It can be seen that supplemental oxygen can be added to this line from oxygen supply 24C. The gases vented through line 23C are recycled via line 24B, with some of the gases being returned to the dual zone pyrolyzing step 113 via gas lines 24A as shown in FIG. 6.

Figure 4:
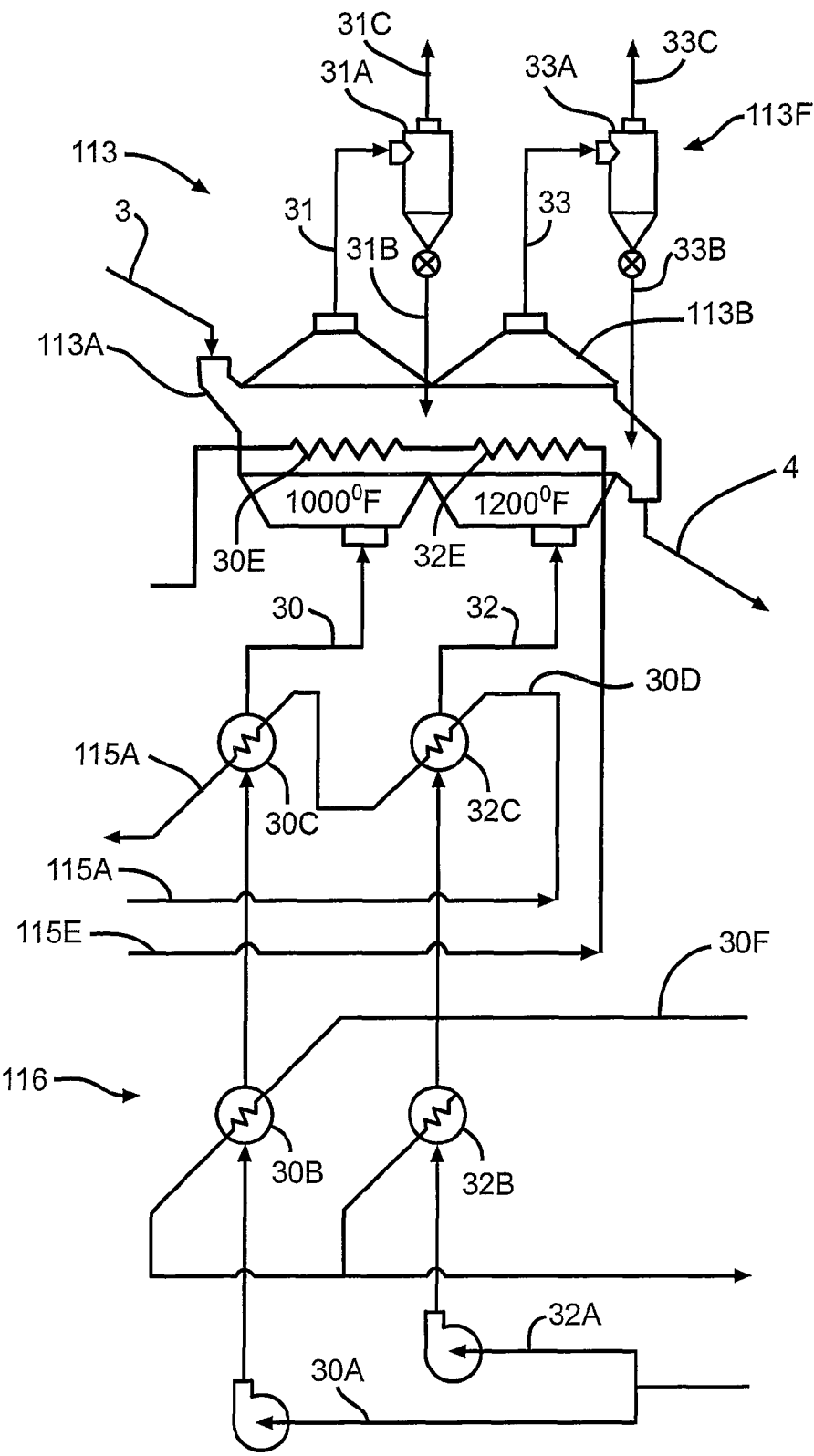
FIG. 4 is schematic illustration of a dual zone pyrolyzing process step of the process shown in FIG. 1.

The heated and dried coal stream 3 is then fed into the dual zone pyrolyzer 113, which has a first pyrolyzer zone 113A and a second pyrolyzer zone 113B. As shown in FIGS. 1 and 4, in the first pyrolyzer zone 113A, the coal is subjected to pyrolyzing gases having a temperature of about 1000° F. (538° C.). The temperature could be higher or lower. The pyrolyzing gases are supplied to the coal in the first pyrolyzer zone 113A via line 30. It is important to conduct the pyrolyzing process in the absence of oxygen to prevent combustion, and therefore the pyrolyzing gases have an oxygen content less than about 0.5 percent. In the illustrated embodiment, the oxygen content is less than about 0.02 percent. In a similar manner the second pyrolyzer zone 113B is supplied with hot oxygen deficient gases via line 32 at a temperature of about 1200° F. (649° C.). The pyrolyzer gases supplied via lines 30 and 32 can come from any suitable source, but in the illustrated embodiment the hot gases are generated by passing gases through heat exchangers 30C and 32C, respectively. These heat exchangers can be supplied with heat from flue gas steam line 30D, which can be supplied from any suitable source, such as flue gas steam line 115A from the fired heater 115.

An optional additional heating system for the hot gases supplied to the lines 30 and 32 is indicated at 116 in FIG. 4. The air or other gases that eventually are supplied to the first and second pyrolyzing zones 113A and 113B are directed through flow lines 30 and 32 by fans 30A and 32A, respectively. Heat exchangers 30B and 32B are provided with heat from an auxiliary source, such as heat transfer fluid, through line 30F. The heat transfer fluid can be heated during the cooling of the coal char in the cooling step 114, shown in FIG. 5. Typically the heat transfer fluid line is limited to temperatures no greater than about 600° F. (316° C.). In this manner heat is recycled from the cooling zone 114A to the first and second pyrolyzing zones 113A and 113B, thereby increasing the efficiency of the process.

Both the first and second pyrolyzing zones 113A and 113B are also supplied indirectly with heat from steam heat exchangers indicated at 30E and 32E. These can be an array of heat exchange pipes for the enclosed or captive flow of steam, or any other suitable indirect heat exchange system. The steam for the heat exchangers 30E and 32E can be from any suitable source, such as the steam supplied by steam line 115E from the fired heater 115. It can be seen that the steam for heat exchanger 30E comes from heat exchanger 32E.

The second pyrolyzing zone 113B is maintained at a higher temperature than the temperature of the first pyrolyzing zone 113A. The result of processing the coal through the pyrolyzing step 113 is a stream of pyrolyzed coal 4 having a temperature of about 1050° F., although it could be higher or lower.

As further shown in FIG. 4, an effluent recovery system 113F is provided to receive the gases vented via lines 31 and 33 from the first pyrolyzer zone 113A and second pyrolyzing zone 113B, respectively. The effluent recovery system 113F includes cyclone separators 31A and 33A which separate the particulate matter, primarily coal and char fines, and return such matter to the first pyrolyzer zone 113A and second pyrolyzing zone 113B via particulate return lines 31B and 33B, respectively. The gases separated from the particulate matter are vented via lines 31C and 33C, respectively to the oil recovery section 117 (shown in FIG. 6) for condensation of volatiles and recovery of oils and tars from the effluent.

Figure 5:
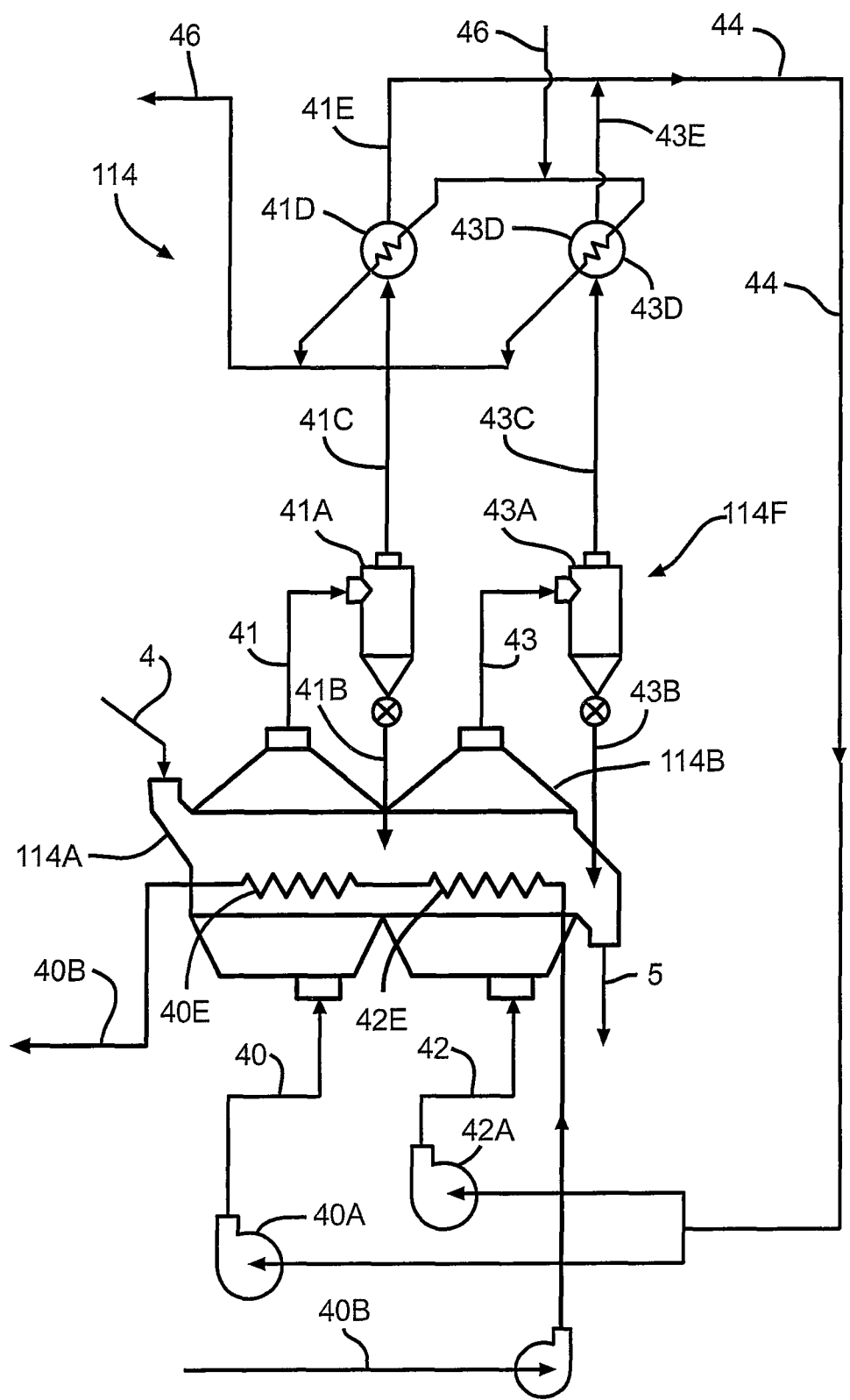
FIG. 5 is schematic illustration of a dual zone cooling process step of the process shown in FIG. 1.

The pyrolyzed coal 4 is then supplied to the cooling section 114, shown in FIGS. 1 and 5. The cooling section has a first cooling zone 114A and second cooling zone 114B. Cooling gases are supplied to the first and second cooling zones 114A and 114B through lines 40 and 42, driven by fans 40A and 42A, respectively. The cooling gases driven through lines 40 and 42 can come from any suitable source. In one embodiment the gases are supplied by recycling gases from the cooler effluent handling system 114F, as shown in FIG. 6. Heat exchangers 40E and 42E are positioned within the zones 114A and 114B, respectively to withdraw heat from the pyrolyzed coal 4. The heat exchangers 40E and 42E can be any suitable mechanisms to transfer heat from the pyrolyzed coal 4 to the heat absorbing medium passing through line 40B. In the illustrated embodiment the heat exchangers 40E and 42E are indirect heat exchangers, and do not add gas flow into the zones 114A and 114B.

As shown in FIG. 5, the pyrolyzer effluent handling system 114F includes cyclone separators 41A and 43A for zones 114A and 114B, respectively. Gases that evolve during the cooling process are removed via effluent lines 41 and 43, respectively, and fed into the cyclone separators 41A and 43A. Solids, such as coal and char fines, are dropped back into the zones 114A and 114B via lines 41B and 43B, and the gaseous portion of the effluent is removed via lines 41C and 43C, respectively, for further treatment. Such treatment can include further heat recovery via heat exchangers 41D and 43D, and a return or recycling of the output 41E and 43E of the heat exchangers 41D and 43D via cooling gas return line 44 to be fed back into the cooling section 114. The further removal of heat with the heat exchangers 41D and 43D is effected by a flow of heat transfer media, such as oil, via heat transfer fluid system 46.

The result of processing the coal through the cooling step 114 is a stream of coal char 5 having a temperature of about 300° F. (149° C.), although it could be higher or lower.

As shown in FIG. 6, the oil recovery system 117 includes absorbers 34 and 35. Absorber 34 is supplied by vent line 31C from the first pyrolyzer zone 113A. The absorber 34 functions to condense the volatile matter within the vented stream 31C and separate the matter into a liquid portion that is drawn off at 34B as a flow of liquids, such as oils and tars. In a similar manner, absorber 35 is supplied by vent line 33C from the second pyrolyzer zone 113B. The absorber 35 functions to condense the volatile matter within the vented stream 33C and separate the matter into a liquid portion that is drawn off at 35B as a liquid, such as oils and tars. Typically, the fluids drawn off at 34B will have a lower boiling point than the fluids drawn off at 35B. The absorbers can be any suitable mechanism to cool and condense the volatile matter from vent steams 31C and 33C from the pyrolyzer section 113. The vent streams 31C and 33C enter the absorbers 34, 35 at a high temperature, which could be at least 800° F. (427° C.) or higher, and the cooling of the vent streams in the absorbers 34 and 35 is partially effected or accomplished by passing heat transfer fluid through the absorbers via cooled heat transfer fluid line 46, which is part of a fluid heat exchange system.

It is to be understood that an auxiliary heater, not shown, can optionally be used during startup to heat the heat transfer fluid to the correct operating temperature. This will be beneficial for heating the second drying zone 111B during start up or after a short shutdown of the process. Also, a steam line heat exchanger, not shown, can also be used to heat the heat transfer fluid during startup or a short shutdown.

As shown, the effluent gases and liquids from the first pyrolyzer zone 113A are kept separate from the effluent gases and liquids from the second pyrolyzer zone 113B, thereby producing separate streams of liquids, i.e., steams 34B and 35B. Since the volatile effluent 31 from the first pyrolyzer zone 113A will be at a lower temperature than the temperature of the volatile effluent 33 from the second pyrolyzer zone 113B, different fractions of hydrocarbon can be removed from the two zones. The temperature of the effluent 31 from the first pyrolyzer zone 113A may be within the range of from about 700° F. (371° C.) to about 900° F. (482° C.), and in a specific embodiment the temperature is about 800° F. (427° C.). The temperature of the effluent 33 from the second pyrolyzer zone 113B may be within the range of from about 900° F. (482° C.) to about 1100° F. (593° C.), and in a specific embodiment the temperature is about 1000° F. (538° C.).

One of the advantages of the system 110 for treating coal is that the efficiency is enhanced because the gases vented from the supplemental heating zone 112B and the gases vented from the first and second pyrolysis zones 113A and 113B (via lines 24A, 34A and 35A, respectively) are recirculated back to the first and second pyrolysis zones. This is particularly advantageous because the composition beneficially raises the mean specific heat of the gas being recirculated through the pyrolysis zones. By using a relatively high specific heat gas stream to deliver direct heat to the coal being thermally processed in the pyrolysis chambers, the heat transfer process will become more efficient. The same amount of heat can be delivered or transferred with a smaller amount of gas. Normal inert flue gas from the combustion of natural gas and air will have a specific heat of about 0.289 Btu/pound ° F. (1.210 kJ/Kg ° C.). Dry air at standard temperature and pressure will have a specific heat of 0.24 Btu/lb ° F. (1.005 kJ/Kg ° C.). Water vapor has a specific heat of 0.48 (2.010 kJ/Kg ° C.) at 60° F. (16° C.) and 100% relative humidity. Methane has a specific heat of 0.554 (2.319 kJ/Kg ° C.) at 60° F. (16° C.). It can be seen that a high specific heat on-gas can be developed using a combination of available gases. In the illustrated embodiment nitrogen is excluded from burning hydrocarbon fuels, particularly because nitrogen has a rather low specific heat at 0.25 (1.047 kJ/Kg ° C.) and the mass is over 70% of the flue gases produced. Therefore, for the pyrolysis zones, it is beneficial to use a mixture of gas components having a specific heat in the order of 0.5 Btu/lb-F (2.013 kJ/Kg ° C.). Optionally, a sulfur removal mechanism 24D is positioned in the system to remove undesirable sulfur from the system. A stream of sulfur is indicated at 24E.

Example I

A chemical analysis of an on-gas composition for gases vented from a pyrolysis process was made. The sulfur component (COS) was removed before the analysis was made. The results are shown in Table I. The mixture of the combined gases had a specific heat of 0.537 (2.248 kJ/Kg ° C.) at 1200° F. (649° C.). Some of the gases in the mixture have increasing specific heats with increasing temperatures.

TABLE I

On-Gas Composition for Pyrolysis

| Gas | Wt. Percent | Cp 58° F. (14° C.) | Cp 1200° F. (649° C.) | Specific Heat Contribution |
|---|---|---|---|---|
| $CO_2$ | 38.78 | 0.199 | 0.265 | 10.29 |
| CO | 15.01 | 0.248 | 0.264 | 3.96 |
| $H_2$ | 5.54 | 3.388 | 3.48 | 19.28 |
| $CH_4$ | 14.09 | 0.554 | 0.554 | 7.81 |
| $C_2H_6$ | 7.37 | 0.386 | 0.386 | 2.84 |
| $H_2O$ | 17.29 | 0.484 | 0.492 | 8.50 |
| $NH_3$ | 1.92 | 0.523 | 0.523 | 1.00 |

The advantage of using a high specific heat on-gas is that the mass of the heating gas is reduced and the partial pressure of the desirable condensable hydrocarbons is greatly increased. Therefore the condensing characteristics of these desirable raw oil heavy hydrocarbons are greatly enhanced. The high specific heat on-gas, combined with the indirect steam coils located in the fluidized bed (see 30E and 32E in FIG. 4) gives rise to a hydrocarbon condensing temperature more in line with the true boiling point of the particular hydrocarbon. The tendency for a dilute gas stream to convey the desirable components as volatiles out of the absorbers 34, 35 is diminished and the collection efficiency for recovering oils and tars as liquids is enhanced.

While the illustrated embodiment uses hot oil heat transfer system, it is to be understood that other fluid heat transfer media could be used instead of oil. One such material is Paratherm HR® heat transfer fluid, available from Paratherm Corporation, 4 Portland Road, West Conshohocken Pa. 19428. Molten salt can also be used.

Although zone 111A is labeled with a temperature of 450° F. for the steam of incoming gases via line 10, and likewise zones 111B, 112A, 112B, 113A, and 113B are also labeled, respectively with temperatures of their respective incoming gases, these labels are merely for illustrative purposes only. Other temperatures for these gases can be used.

As explained above, various zones are arranged with two adjacent zones arranged in a connected manner. This arrangement enables an efficiency in construction of the apparatus for carrying out the process. Further, the use of dual zones enables an efficiency in supplying various materials to the zones, such as the supplying of steam to the zones, for example. Also, the feed of the coal from zone to zone is made more efficient when the zones are connected to each other. It is to be understood, however, that the zones need not necessarily be connected to each other. Therefore, a dual zone step is a process step using two different zones, and the two different zones may or may not be physically connected together.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:

1. A process for treating coal, the process comprising:
drying coal in a drying step;
pyrolyzing the coal in a dual zone pyrolyzer to form coal char, including venting effluent from each zone of the pyrolyzer;
subjecting the effluents to a condensation process to separate the effluents into liquids and on-gases;
blending the on-gases with other available gases to achieve a composition of blended on-gases having a specific heat of at least about 0.50 Btu/lb-° F. (2.013 kJ/Kg ° C.) at 1200° F. (649° C.); and
recirculating the blended on-gases into the pyrolyzer.

2. The process of claim 1 in which the effluent gases withdrawn from the first pyrolyzer zone are subjected to a condensation process to separate the effluent into liquids and on-gases, and the effluent gases withdrawn from the second pyrolyzer zone are subjected to a condensation process to separate the effluent into liquids and on-gases, wherein the effluent gases and liquids from the first pyrolyzer zone are kept separate from the effluent gases and liquids from the second pyrolyzer zone, thereby producing separate streams of liquids.

3. The process of claim 2, wherein the composition of blended on-gases comprises portions of the effluent gases from the first pyrolyzer zone and the second pyrolyzer zone.

4. The process of claim 1, wherein the composition of blended on-gases comprises water vapor blended with portions of the effluent gases from a pyrolyzer zone.

5. The process of claim 1, wherein the composition of blended on-gases recirculated to the pyrolyzer comprises an oxygen content of less than about 0.5 wt %.

6. The process of claim 1, wherein the composition of blended on-gases excludes nitrogen above a level of about 2 wt %.

7. The process of claim 1, further comprising treating the dried coal in a supplemental heating zone and venting effluent from the supplemental heating zone, wherein the composition of blended on-gases comprises effluent from the supplemental heating zone blended with portions of the effluent gases from a pyrolyzer zone.

8. The process of claim 1 further comprising heating each of the pyrolyzer zones with both a source of direct heat with hot gases and a source of indirect heat with a heat exchanger.

9. The process of claim 1 further comprising pyrolyzing the coal in the first pyrolyzer zone at a temperature from about 700° F. (371° C.) to about 900° F. (482° C.), and pyrolyzing the coal in the second pyrolyzer zone at a temperature from about 900° F. (482° C.) to about 1100° F. (593° C.).

10. The process of claim 1 in which the drying step is a dual zone step, with the coal initially subjected to drying in a first drying zone, and then subsequently heated in a second drying zone, with the temperature of second drying zone being higher than that of the first drying zone.

11. The process of claim 10, further comprising maintaining the temperature of the first drying zone at no greater than about 500° F. (260° C.); and maintaining the temperature of the second drying zone at no greater than about 600° F. (315° C.).

12. The process of claim 10, further comprising heating each of the drying zones with both a source of direct heat with hot gases and a source of indirect heat with a heat exchanger.

13. The process of claim 1, further comprising an oxidizing step to coat the coal particles with oxides.

14. The process of claim 13, further comprising maintaining the temperature of the oxidizing step at about 700° F. (371° C.).

15. The process of claim 13 in which the oxidizing step is supplied with waste heat from the pyrolysis step.

16. The process of claim 13 in which the drying step is supplied with waste heat from the oxidizing step.

17. The process of claim 1, further comprising cooling the coal char in a dual zone step, with the coal char initially cooled in a first cooling zone, and then subsequently cooled in a second cooling zone.

\* \* \* \* \*